United States Patent [19]

Vieri

[11] 3,775,559

[45] Nov. 27, 1973

[54] APERTURE DESIGNS FOR FACSIMILE SCANNING APPARATUS

[75] Inventor: Bruno J. Vieri, Rochester, N.Y.

[73] Assignee: Xerox Corporation, Stamford, Conn.

[22] Filed: Nov. 12, 1970

[21] Appl. No.: 88,896

[52] U.S. Cl. .......... 178/7.1, 178/DIG. 25
[51] Int. Cl. .......... H04n 5/14
[58] Field of Search .......... 176/DIG. 2, DIG. 25, 176/7.3 R, 7.1; 350/362 SF; 250/227, 202, 237 R, 237 G, 219

[56] References Cited

UNITED STATES PATENTS

| | | | |
|---|---|---|---|
| 3,193,687 | 7/1965 | Hatcher | 250/237 R |
| 2,912,496 | 11/1959 | Jelinek | 178/DIG. 25 |
| 2,759,044 | 8/1956 | Oliver | 178/DIG. 25 |

*Primary Examiner*—Robert L. Richardson
*Assistant Examiner*—John C. Martin
*Attorney*—James J. Ralabate, John E. Beck and Franklyn C. Weiss

[57] ABSTRACT

Definite limits on bandwidth and transmission time in facsimile communication lead to a system designed to have the lowest acceptable resolution, but with the best possible Modulation Transfer Function (MTF) within the limits. Fourier transform methods are applied herein to facsimile scanning techniques which include the effects of the sampling action of scanning. A multi-aperture scanner is disclosed as the conclusion of the analysis with selective positive and negative detection of the calculated aperture response lobes so as to produce the sharpest facsimile reproduction with minimum aliasing and extraneous line structure reproduction.

28 Claims, 40 Drawing Figures

RASTER FORMAT

SPACE - TIME MAPPING

INVENTOR.
BRUNO J. VIERI
BY Franklyn C. Weiss
ATTORNEY $$P_1 = \frac{\sin 2\pi af}{2\pi af}$$

$$P_1 = \frac{1}{\pi af} J_1(2\pi af)$$

$$P_3 = \frac{\sin^2 \pi af}{(\pi af)^2}$$

$$P_4 = \frac{\sin 2\pi af}{2\pi af(1-4a^2f^2)}$$

APERTURE DESIGNS FOR FACSIMILE SCANNING APPARATUS

BACKGROUND OF THE INVENTION

In prior art facsimile systems, a document to be transmitted is scanned at a transmitting station to convert information on the document into a series of electrical signals. These video signals, or carrier modulated signals corresponding thereto, are then coupled to the input of a communication link interconnecting the transmitter with the receiver. At a receiving station, the video signals, in conjunction with suitable synchronizing signals, selectively control the actuation of appropriate marking means to generate a facsimile of the document transmitted.

If such a facsimile system is linear throughout, the overall Modulation Transfer Function is the product of the transfer functions of (1) the imaging system in the scanner; (2) the sensor aperture; (3) the electrical system; and (4) the recording stylus and process or the recording aperture, imaging system, and the process. Because the limiting resolution is usually so low that the degradation due to the optical systems can easily be avoided and because the frequency response of the electrical system can readily be made uniform, the effects of the scanning aperture and of the printing stylus-process combination usually predominate.

OBJECTS

It is, accordingly, the object of the present invention to provide methods and apparatus for optimizing the effects of the scanning aperture and of the printing stylus-process combination in a facsimile communication system.

It is another object of the present invention to produce a multi-aperture scanner in a facsimile transmitter to optimize the overall modulation transfer function.

It is another object of the present invention to analyze the optical transfer function of a facsimile communication system and to optimize the effects of the scanning aperture to produce an overall improved output facsimile document in a facsimile communication system.

BRIEF SUMMARY OF THE INVENTION

By analyzing the operation of a facsimile optical scanner in a facsimile communication system, it is found that the effects of the scanning aperture and of the printing stylus-process combination usually predominate in the overall modulation transfer function of the system. That is, by designing a scanning aperture in conjunction with the specific range of documents to be transmitted, the overall modulation transfer function can be optimized in order to reduce aliasing and other printed line errors. By empirical analysis, it was found that a specific scanning aperture Fourier transform response reduces the effects of such facsimile output degradation. In accordance therewith, a multi-apertured scanner is disclosed with positive and negative responses thereto in order to generate the output voltage signals to accommodate the optimized overall modulation transfer function.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

Figure 1:
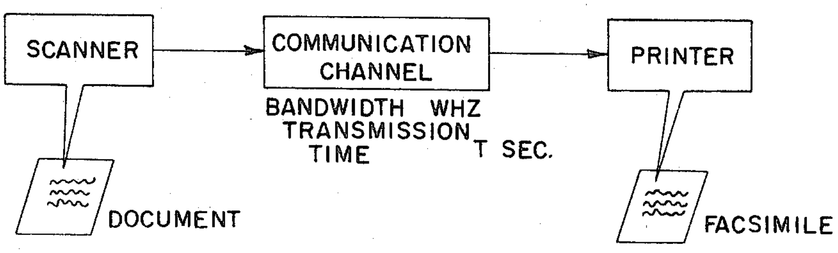
FIG. 1 is a block diagram of a facsimile transmission system employing the principles of the present invention.

The basic parts of a facsimile communication system include a scanner, a communication channel, and a printer. Referring to FIG. 1, a source document or image is scanned in a regular pattern called a raster by any of the known optical scanning techniques so that the two dimensional input is mapped into a time-varying signal. The signals are then transmitted via a communication channel such as a telephone line, microwave system, or other media, said media having a bandwidth of W hertz with a transmission time of T seconds. The printer would convert the electrical signals received over the communication channel to signals to be imprinted on an output record sheet, using any of the prior art techniques to produce a facsimile of the original document.

Figure 2A:
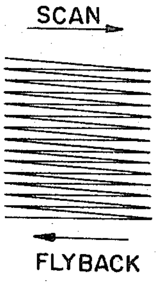
FIGS. 2*a* and 2*b* show the prior art raster format and space-time mapping technique well known in the prior art.
Figure 2B:
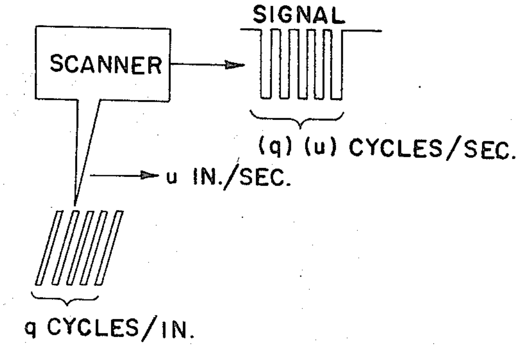

The path of the scanner is usually a grid of closely spaced parallel tracks across the document, as shown in FIG. 2*a*. The scanner follows each track at constant velocity, then flies back to the beginning of the next line. Signal frequencies are proportional to the corresponding spatial frequencies in the scan direction. FIG. 2*b* shows that if the scan velocity is u inches per second, a bar pattern of $q$ line pairs per inch (i.e. cycles per inch) set perpendicularly to the scan generates a signal component at $qu$ cycles per second.

Thus, a simple formula relates the limiting resolution, the signal bandwidth, the document size, and the transmission time as $$T = (2R_xR_yXY/W) + T_o \quad (1)$$

where the symbols can be taken from the following glossary of principal symbols used in this application. The direction along the scan is referred to as horizontal.

a(x,y) Source document or image reflectance
a(x), A(f) Horizontal scan of source document and Fourier transform
a(y), A(g) Vertical scan of source document and Fourier transform
$a_1(y)$, $A_1(g)$ Vertical sample set from scanner and Fourier transform
b(x,y) Facsimile reflectance
b(x), B(f) Horizontal section of facsimile and Fourier transform (optical transfer function)
b(y), B(g) Vertical section of facsimile and Fourier transform (optical transfer function)
d Separation of scan lines
f Spatial frequency measured horizontally (x direction)
g Spatial frequency measured vertically (y direction)
i, n Integers
j $\sqrt{-1}$
$R_x$ Horizontal resolution (lp/in.)
$R_y$ Vertical resolution (lp/in.)
$p_1(s)$, $P_1(f)$ Scanner-aperture horizontal response and Fourier transform
$p_2(s)$, $P_2(f)$ Printer-aperture horizontal response and Fourier transform
s Aperture response independent variable (linear distance)
III(y) Infinite regular set of unit impulses
T Transmission time (sec.)
$T_o$ Total flyback time (sec.)
v(x), V(f) Electrical signal and Fourier transform of source document reflectance
W Signal bandwidth (Hz)
x Abscissa
X Width of scanned area (in.)
y ordinate
Y Height of scanned area (in.)
$z_1(s)$, $Z_1(g)$ Scanner-aperture vertical response and Fourier transform
$z_2(s)$, $Z_2(g)$ Printer-aperture vertical response and Fourier transform The electrical signal for the detected document reflectance must be encoded to match the communication channel. Optimization of the process assumes for the analysis herein that the decoded output of the communication channel is identical to the input to the encoder.

At the printer in FIG. 1 a recording stylus or other means scans in synchronism with the sensor at the scanner and produces a facsimile of the source document. Various recording processes are well known in the prior art.

Figure 3A:
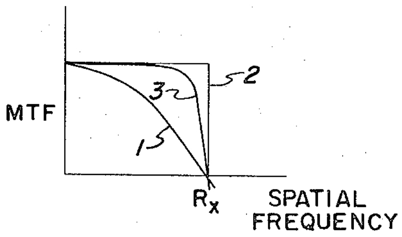
FIGS. 3*a* and 3*b* show the various modulation transfer functions and edge response curves for typical facsimile systems.
Figure 3B:
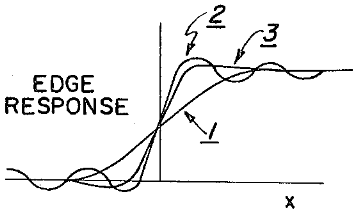

As seen in equation 1 above, for a given bandwidth and document size, the product $R_xR_y$ and transmission time T are directly proportional. In practice, for example, the compromise is usually weighted towards shortening the transmission time, where a resolution of 48 line pairs per inch (2 *lp/mm*) is typical. At such low resolution, the subjective impression of copy sharpness depends strongly on the shape of the Modulation Transfer Function (MTF). FIG. 3 shows the relationship between the Modulation Transfer Function and edge sharpness for symmetrical apetures. The non-uniform MTF curve No. 1 in FIG. 3*a* produces poor edge response as seen by curve No. 1 in FIG. 3*b*. The uniform MTF curve No. 2 in FIG. 3*a* enhances sharpness, but the edges of the printed information are degraded by "ringing" as seen in curve 2 of FIG. 3*b*. A more gradual cutoff is better with an MTF curve No. 3 in FIG. 3*a* corresponding to the edge response curve No. 3 in FIG. 3*b*. Thus, while the precise form of the MTF is a matter for subjective determination by a human viewer, hereinafter follows the discussion of designing such a chosen Modulation Transfer Function.

If a facsimile system is linear throughout, the overall Modulation Transfer Function (MTF) is the product of the transfer functions of:

1. the imaging system in the scanner;
2. the sensor aperture;
3. the electrical system;
4. the recording stylus and process or the recording aperture, imaging system, and process thereof.

Because the limiting resolution is usually so low that degradation due to the optical systems can easily be avoided and because the frequency response of the electrical system can readily be made uniform, the effects of the scanning aperture and of the printing stylus-process combination usually predominate.

Figures 4A, 4B, 4C:
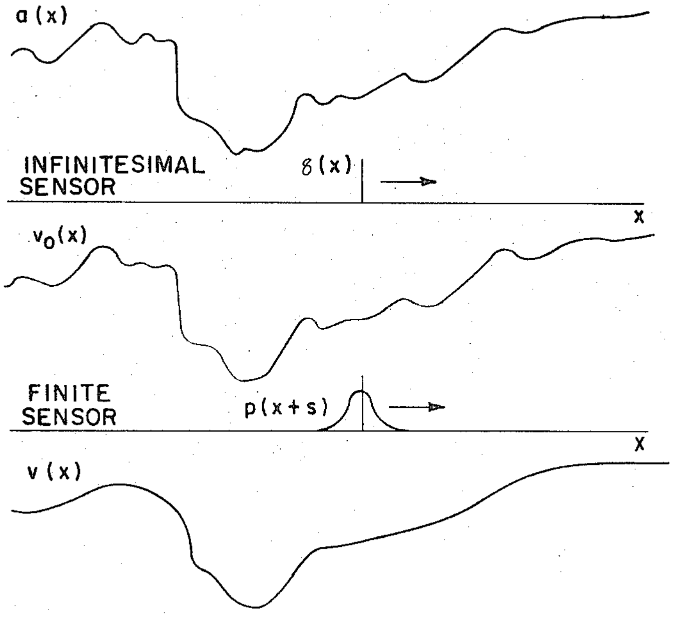
FIGS. 4*a* to 4*c* show a typical document reflectance characteristic and the signal voltage generated therefrom in response to an infinitesimal sensor and a finite sensor.

A document or image can be regarded as a two-dimensional pattern of reflectance or luminance a(x,y). The facsimile can be regarded as a similar pattern b(x,y). FIG. 4*a* shows an infinitesimal sensor moving to the right across such a pattern of reflectance a(x). If the scanning photosensor is linear, the voltage output from the sensor $v_o(x)$ is shown to be directly in accordance with the reflectance of the document. However, as in FIG. 4*c*, if the scanning photosensor has a finite aperture the signal v (x) is not proportional to a (x). Practical apertures are finite and they do attenuate high spatial frequencies.

Figure 5A:
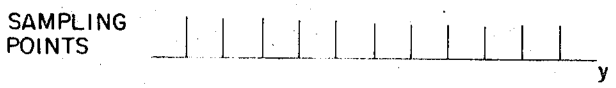
FIGS. 5*a* to 5*e* show the various sampling and resultant signal values for a low resolution image and a high resolution image.
Figure 5B:
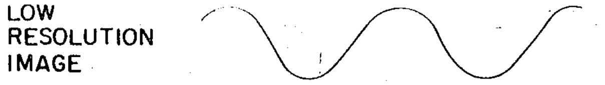
Figure 5C:
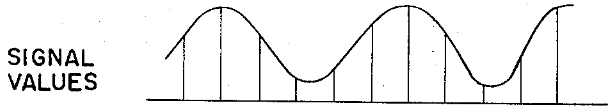
Figure 5D:
Figure 5E:
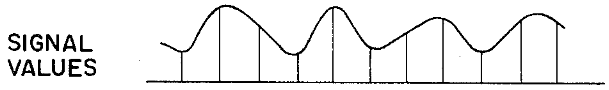

Along the other dimension, the y axis, the reflectance a(y) is sampled by a succession of scans. FIG. 5 exhibits these properties wherein a low resolution image as seen in FIG. 5*b* is sampled at the sampling points shown in FIG. 5*a*. FIG. 5*c* shows the signal values determined by the combination of the sampling points in FIG. 5*a* utilized in scanning the low resolution image in the y direction in FIG. 5*b*. With a high resolution image, however, the number of sampling points becomes critical as seen in FIGS. 5*d* and 5*e*. That is, utilizing the sampling points seen in FIG. 5*a* to sample the high resolution image seen in FIG. 5*d*, the resultant signal values seen in FIG. 5*e* no longer accurately follow the high resolution image of FIG. 5*d*. Thus, FIG. 5 clearly shows that with an infinitesimal aperture, the electrical signal represents the document only at discrete points. Image formations are thus liable to be misrepresented, irreversibly so if there are components beyond the resolution limit of the system.

In order to optimally design for the best attainable Modulation Transfer Function, it may help here to analyze the scanning process utilized by the present inventor. Prior analyses of scanning have been published by P. Mertz and F. Gray, "A Theory of Scanning and Its Relation to the Characteristics of the Transmitted Signal in Phototelegraphy and Television," Bell System Technical Journal, 13, page 464 (1934), and by O. H. Schade, "Image Gradation, Graininess and Sharpness in Television and Motion Picture Systems," Part III, J. S. M. P. T. E., 61, page 97, August, 1953. In the following discussion rectangular scanning is analyzed by Fourier methods. The analysis is in two parts: the effect of linear scanning, and the sampling effect of a succession of scans. While the first part is generally known in the art, it is included by way of introduction and to present a complete analysis.

As a background to the following analysis, reference is made to the following publications: (1) P. M. Woodward, Probability and Information Theory, With Applications to Radar, Pergamon Press, Oxford (1953); (2) J. W. Goodman, Introduction to Fourier Optics, McGraw-Hill, San Francisco (1968); and (3) A. Papoulis, Systems and Transforms with Applications in Optics, McGraw-Hill, New York (1968). With reference to FIGS. 6a through 6e, if the scanning aperture response in the direction of scan is $p_1(s)$, with its Fourier transform as $P_1(-f)$, and if the document reflectance is described by $a(x)$, with its transform as $A(f)$, then the electrical signal derived from the document is:

$$v(x)=\int_{-\infty}^{\infty} p_1(s)a(x+s)ds. \quad (2)$$

Taking the Fourier transform of equation 2, $$V(f)=\iint_{-\infty}^{\infty} exp\ (-j2\pi fx)\,p_1(s)dsdx. \quad (3)$$

Figure 6A:
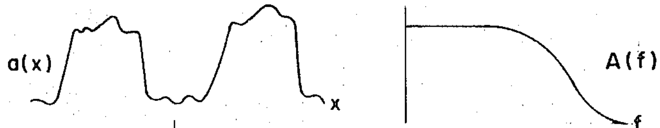
FIGS. 6*a* through 6*e* show various curves helpful in understanding the analysis made in the body of the specifi-cation hereto.
Figure 6B:
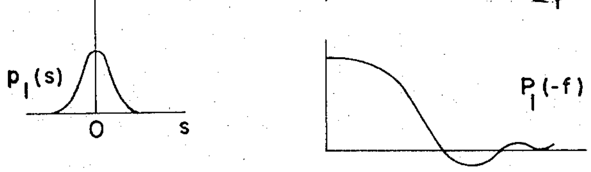
Figure 6C:
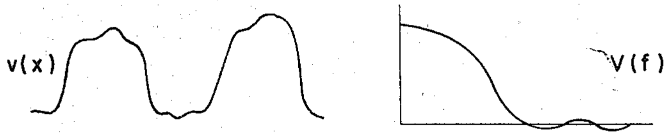

Let: $x+s=x'$.
Then $$V(f)=\iint_{-\infty}^{\infty} exp\ (-j2\pi fx')a(x')\ exp\ (j2\pi fs)\,p_1(s)dsdx', \quad (4)$$

$$V(f)=A(f)P_1(-f). \quad (5)$$

where $V(f)$ is the Fourier transform of the electrical signal as seen in FIG. 6c.

Figure 6D:
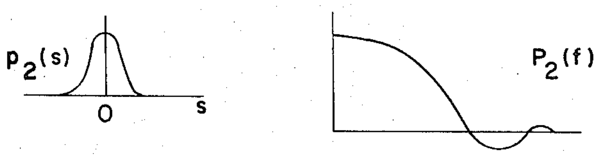
Figure 6E:
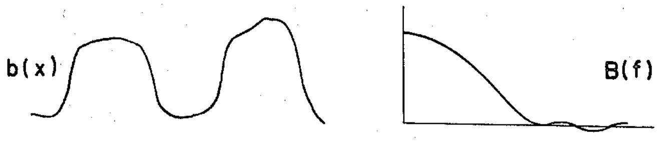

If the printer stylus or aperture and process combination has a response $p_2(s)$ as in FIG. 6d, then the printed copy is defined by the convolution integral:

$$b(x)=\int_{-\infty}^{\infty} p_2(s)v(x-s)ds. \quad (6)$$

which can be seen as the curve in FIG. 6e. The Fourier transform, as seen in FIG. 6e is:

$$B(f)=\iint_{-\infty}^{\infty} exp\ (-j2\pi fx)\,p_2(s)v(x-s)dsdx. \quad (7)$$

Let: $x-s=x'$
Then $$B(f)=\iint_{-\infty}^{\infty} exp\ (-j2\pi fs)\,p_2(s)\ exp\ (-j2\pi fx')v(x')dsdx' \quad (8)$$

$$=P_2(f)V(f). \quad (8')$$

therefore it can be seen that the Fourier transform of the reflectance of the facsimile reproduced is $$B(f)=A(f)P_1(-f)P_2(f). \quad (9)$$

Figure 7A:
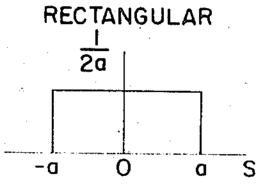
FIGS. 7*a* through 7*e* show the various aperture response curves and overall transfer function of typical scanner aperture responses.
Figure 7B:
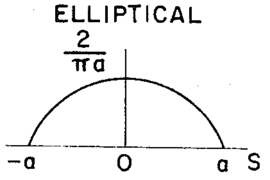
Figure 7C:
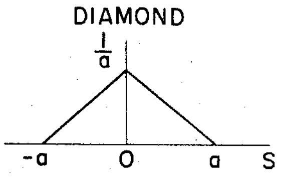
Figure 7D:
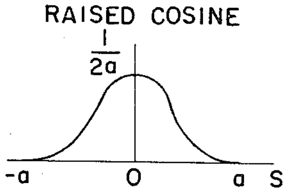
Figure 7E:
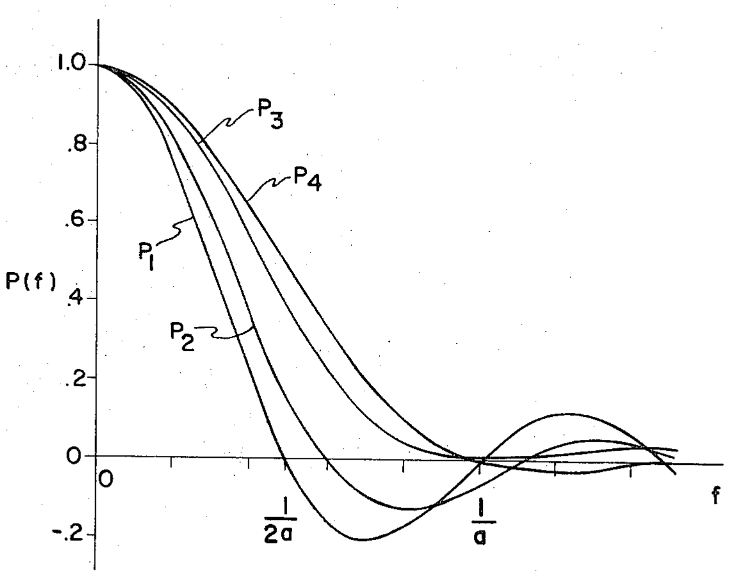

Thus, the Optical Transfer Function (OTF) in the $x$ dimension is the product of the transform of the printer aperture response, $P_2(f)$, and a function equal to the inverse transform of the scanner aperture response, $P_1(-f)$. The Modulation Transfer Function (MTF) is the modulus of the optical transfer function. FIG. 7 shows examples of responses of various apertures and the respective Fourier transforms thereof. FIG. 7a shows the commonly used rectangular shaped aperture, FIG. 7b shows an elliptical aperture, FIG. 7c shows a diamond-shaped aperture, while FIG. 7d shows a raised cosine aperture. FIG. 7e shows the Fourier transforms of the aperture responses plotted with respect to each other.

Figure 8A:
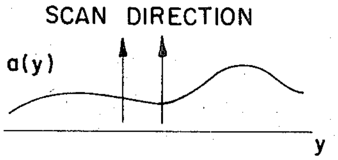
FIGS. 8*a* through 8*k* show the various curves helpful in analyzing the operation of a facsimile scanner.
Figure 8F:
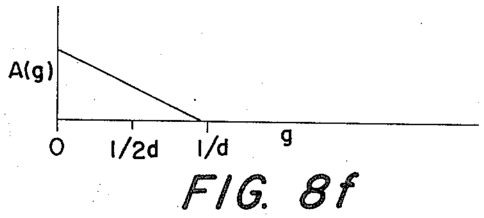
Figure 8B:
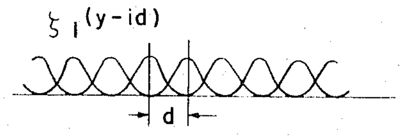
Figure 8G:
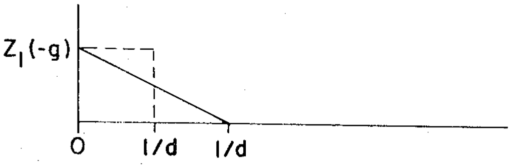

The above analysis has been concerned with the response in the horizontal or $x$ direction. In the vertical or $y$ direction, reference is made to FIG. 8. The examples of $a(y)$, $z_1(s)$, $z_2(s)$ and their transforms were arbitrarily chosen. To simplify the illustrations, symmetrical apertures were used. FIG. 8a shows the document reflectance $a(y)$ with the abscissa of the curve being measured in the $y$ direction. If the scanner aperture response is $z_1(s)$, then for a succession of scans taken across the curve in FIG. 8a, at a distance $d$ from each other, then it can be seen in FIG. 8b the aperture response for each scan thereof is equivalent to $z_1(y-id)$. With the document response curve in FIG. 8a and the aperture response curves in FIG. 8b, the resultant curve is FIG. 8c which comprises a set of values, $a_1(y)$, a modulated impulse train. In accordance with the discussion hereinbefore set forth in this specification, the transform for the reflectance of a generalized document can be seen in FIG. 8f. Further, the transform of the aperture response in FIG. 8b is seen in FIG. 8g. For sharpest response, that is, for an output facsimile document with the most sharpness, the transform in FIG. 8g would be rectangular as seen in dotted lines in the figure. The prior analysis as seen in FIG. 3a has shown that for sharpest response the Modulation Transfer Function should be rectangular as seen as curve 2 in FIG. 3a. FIG. 8h shows the Fourier transform of the vertical hypothetical sample set from the scanner. Each component of the Fourier transform is obtained by multiplying the curve in FIG. 8f by the curve in FIG. 8g. The derivation of this may be seen by the following discussion.

Figure 8C:
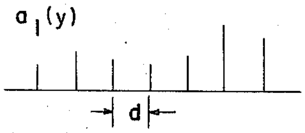
Figure 8H:
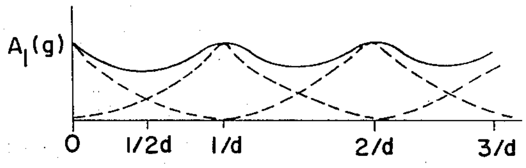

The Fourier series expansion of a train of unit impulses with a separation $d$ apart is:

$$III(y)=\frac{1}{d}\sum_{n=-\infty}^{\infty} \exp\ (j2\pi ny/d). \quad (10)$$

so that $$a_1(y)=\frac{1}{d}\int_{-\infty}^{\infty} \zeta_1(s)a(y+s) \sum_{n=-\infty}^{\infty} \exp\ (j2\pi ny/d)\,ds. \quad (11)$$

the curve seen in FIG. 8c. The Fourier transform of this is:

$$A_1(g)=\frac{1}{d}\sum_{n=-\infty}^{\infty}\int_{-\infty}^{\infty}\int \exp\left[j2\pi y\left(\frac{n}{d}-g\right)\right]\zeta_1(s)a(y+s)dsdy. \quad (12)$$

where $A_1(g)$ is the transform of the spatial field in the $y$ direction.

Let:

$$y+s=y'$$

Then frequencies, that is, $-1/(2d) \leq g \leq 1/(2d)$. The ModulationTransfer Function within this band is $|Z_1(-g)\ Z_2\ (g)|$.

2. If $Z_2(g)$, the Fourier transform of the printer aperture vertical response, is non-zero outside the baseband, unwanted bands of components are printed, cen- $$A_1(g)=\frac{1}{d}\sum_{n=-\infty}^{\infty}\int_{-\infty}^{\infty}\int \exp\left[-j2\pi\left(\frac{n}{d}-g\right)\right]\zeta_1(s)\ \exp\left[-j2\pi y'\left(g-\frac{n}{d}\right)\right]a(y')dsdy' \quad (13)$$

which may be reduced to $$A_1(g)=\frac{1}{d}\sum_{n=-\infty}^{\infty}Z_1\left(\frac{n}{d}-g\right)A\left(g-\frac{n}{d}\right). \quad (14)$$

Thus, the Fourier transform for the spatial field in the $y$ direction is, the sum of a series of component bands. Each component band is the product of the curves in FIGS. 8*f* and 8*g*.

Figure 8I:
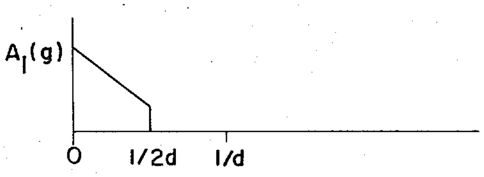
Figure 8D:
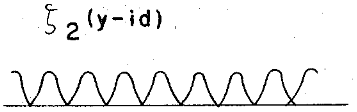
Figure 8J:
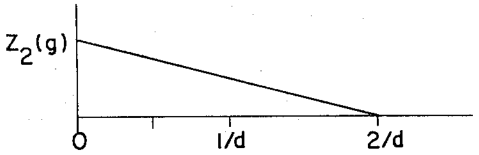
Figure 8E:
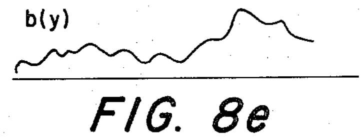

The analysis for the printer response is seen in FIGS. 8*d*, 8*e*, 8*j*, and 8*k*. Thus, if the printer aperture response is $z_2(s)$, with the entire series for the succession of scans equivalent to the spacing in FIG. 8*b*, the curve seen in FIG. 8*d* comprises $z_2(y-id)$. FIG. 8*e* shows the curve $b(y)$ which is the printed facsimile response from the original document reflectance seen in FIG. 8*a*. $b(y)$ is given by $$b(y)=\int_{-\infty}^{\infty}\zeta_2(s)a_1(y-s)ds. \quad (15)$$

Figure 8K:
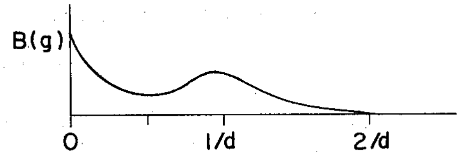

Taking the Fourier transform of equation 15:

$$B(g)=\int_{-\infty}^{\infty}\int \exp\ (-j2\pi gy)\zeta_2(s)a_1(y-s)dsdy. \quad (16)$$

which is the Fourier transform seen in FIG. 8*k*.

Let:

$$y-s=y'$$

Then $$B(g)=\int_{-\infty}^{\infty}\int \exp\ (-j2\pi gs)\zeta_2(s)\ \exp\ (-j2\pi gy')a_1(y')dsdy' \quad (17)$$

$$= Z_2(g)A_1(g). \quad (18)$$

Substituting for $A_1(g)$as derived above in equation 14, $$B(g)=\frac{1}{d}Z_2(g)\sum_{n=-\infty}^{\infty}Z_1\left(\frac{n}{d}-g\right)A\left(g-\frac{n}{d}\right). \quad (19)$$

where $B(g)$ is the Optical Transfer Function in the vertical direction. By the above discussions, in the direction of scan in the $x$ direction, the overall transfer function is adequately described by $P_1(-f)P_2(f)$. In this dimension the aperture response can be made as sharp as desired and electrical networks can be used for correction and bandlimiting.

In the $y$ direction, however, several effects are found:

1. According to the sampling theorem found in the Woodward reference set forth above, the only useful part of the image spectrum is the baseband of spatial tered on frequencies $n/d$. These result in a visible line structure.

3. If $Z_1(-g)$ and $A(g)$ are non-zero outside the baseband, the bands of components centered on the frequencies $n/d$ overlap each other and intrude into the baseband, an effect known as "aliasing." Reference is made to FIGS. 8*f*, 8*g*, and 8*h*. The more obvious results have been described as "spurious resolution" and "Moire patterns" which are particularly troublesome with half-tone images, but aliasing is also a cause of omissions, line thickening, and raggedness.

Figure 9A:
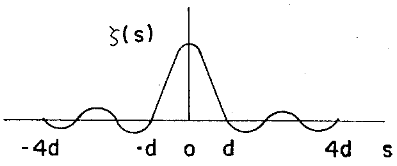
FIGS. 9*a* through 9*e* show the physical embodiment of the facsimile scanner based upon the conclusion of the empirical analysis.
Figure 9B:
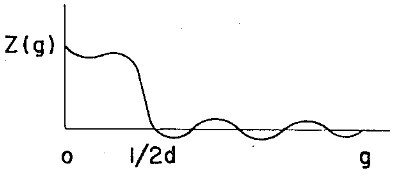
Figure 9A:
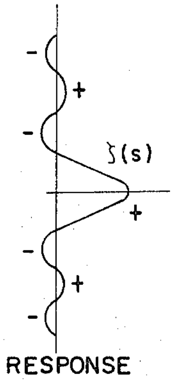
Figure 9C:
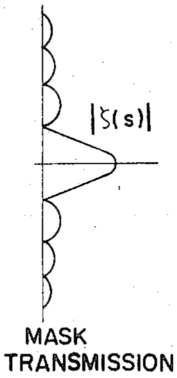
Figure 9D:
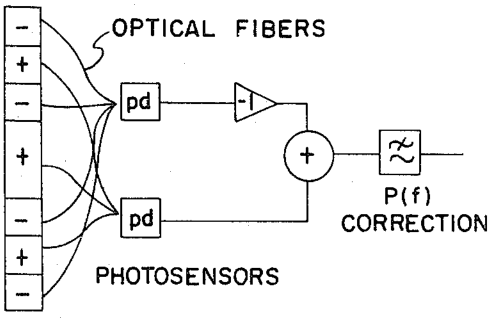
Figure 9E:
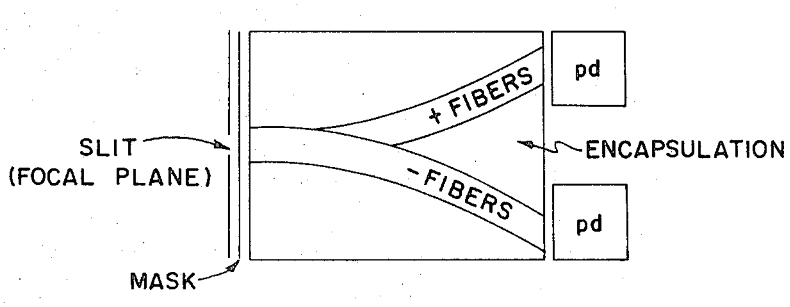

Along the scan in the $x$ direction, the responses $p_1\ (s)$ and $p_2(s)$ may be those given by narrow slits FIG. 9*c*. Suitable compromises between sensitivity and sharpness are pratical.

Good characteristics across the scan, in the $y$ direction, are less easily achieved. For maximum sharpness $z_1(-g)$ and $z_2(g)$ should be uniform within the baseband, i.e., the Modulation Transfer Function should be rectangular as seen at curve 2 in FIG. 3*a*. To avoid aliasing and to avoid the line structure surrounding the printed information, the Modulation Transfer Function should be zero elsewhere, i.e., zero outside of the baseband. The corresponding aperture response for the immediately preceding conditions is:

$$z(s) = (\sin \pi s/d/\pi s/d) \quad (20)$$

This function is bi-polar and infinite in $s$. In practice, it can be truncated and slightly modified to provide a less sharp cutoff in the frequency domain, but responses of both polarities are still required. Returning to FIG. 8, if $-(1/2d) \leq g \leq (1/2d)$ is defined as the baseband, then the solid line curve of the transform in FIG. 8*g* is unacceptable in that the Fourier transform of the scanner aperture response is not zero outside the baseband. For the transform to be zero outside the baseband and to be uniform within the baseband, as for equation 20, the transform should be as the dotted line seen in FIG. 8*g*. Multiplying the curves of FIG. 8*f* and FIG. 8*g* as hereinabove fully set forth, the curve shown, in FIG. 8*i* is achieved for the Fourier transform in the baseband of a hypothetical vertical sample set from the scanner.

A practical design for realizing transfer functions of the type seen in FIG. 3*a*, curve 3, is shown in FIG. 9. FIG. 9*a* shows the plotted curve derived from equation 20. FIG. 9*b* shows the transform of the scanner aperture response for this calculated aperture. FIG. 9*a'* is FIG. 9*a* rotated about the axis to show the physical placement of an aperture with such a response to generate the necessary signals in conjunction with equation 20. Since the aperture response curve seen in FIG. 9*a'* cannot be, per se, generated in the physical world due to the fact that a negative response cannot be generated from a document, a mask with the absolute value seen in FIG. 9*c* is placed in front of the optical fiber network seen in FIG. 9*d*. Such a mask, for example, could comprise a pattern of lighter and darker shadow patterns on a substrate to give an optical response of light transmitted through it as seen in FIG. 9*c*. The optical response through the negative lobes of the curve in FIG. 9*a'* are, by optical fibers, directed to one photosensor while the positive lobes of the curve in FIG. 9*a* are directed, by similar optical fibers, to another photosensor. The output of one detector is inverted and summed with the output of the other prior to transmission. Alternatively, a plurality of photosensors in an array could be utilized, the outputs therefrom selectively inverted and summed prior to transmission.

The configuration shown is not useful in a printer because negative lobes are not realizable in this way. That is, at the printer, no current process has the property of algebraic addition which is needed to achieve a good M.T.F. directly. However, the scanner mask can be designed to compensate loss of sharpness due to a conventional printer stylus or aperture. The line structure could be reduced by intentionally broadening the response of the printer stylus and adding more compensation at the scanner.

Alternatively, the desired aperture response can be realized approximately by a segmented aperture or stylus driven through a set of electrical delay elements. Each element stores the signal for exactly one line-scan period and thus the set makes available a number of signal values which correspond to points or a straight line perpendicular to the scan direction. The signal applied to each segment of the stylus is a weighted algebraic sum of the signals at the outputs of the delay elements. Thus, more than one line would be printed for each scanned line, the printed lines being interpolated from received data to imitate a multilobed bi-polar stylus.

In conclusion, therefore, because of the high cost of telecommunication links, the resolution of practical facsimile systems is substantially lower than the highest spatial frequencies present in typical copy. Within the limits of resolution, and where equation (1) is valid, a good Modulation Transfer Function requires no more transmission time or bandwidth than a bad Modulation Transfer Function. Because the limiting resolution is $(R_x^2 + R_y^2)^{1/2}$ the MTF of the optical system should be valid up to that spatial frequency. In a linear system, the response to higher frequencies is inconsequential. Response along the scan line, in the $x$ direction, can be controlled by a compromise aperture response and by electrical filters. Across the scan, however, in the $y$ direction, the electrical correction is difficult and it is better to use suitable multiple apertures as hereinabove fully discussed in conjunction with FIGS. 1 to 9. Three types of degradation have been considered which may be reduced by careful aperture design and, if desired, interpolation of extra lines at the printer: (i) spurious patterns due to aliasing at the scanner; (ii) a line structure in the output copy; and (iii) significantly non-uniform transfer functions. There is little to choose between most mono-polar aperture responses. Multiple apertures with positive and negative elements can be given desirable characteristics, as hereinabove set forth, and are useful in certain types of scanners.

In the foregoing, there has been disclosed methods and apparatus for improving aperture response by the use of multi-aperture scanning with the best possible Modulation Transfer Function within the limits of resolution. Therefore, while the invention has been described with reference to specific embodiments, it will be understood by those skilled in the art that various changes may be made and equivalents may be substituted for elements thereof without departing from the true spirit and scope of the invention. In addition, many modifications may be made to adapt to a particular situation without departing from the essential teachings of the invention.

What is claimed is:

1. Aperture scanning apparatus in a facsimile transmission system comprising:

optical mask means in the path of the information modulated light reflected from a document to define the response of the aperture, said mask means having shadow patterns comprising portions with transmissivities defining the absolute values of positive and negative values in accordance with a predetermined calculation of said aperture response.

2. The apparatus as set forth in claim 1 further including:

first light sensitive means for receiving the light transmitted through the portions of said mask means defining the absolute value of the positive value of said aperture response, and second light sensitive means for receiving the light transmitted through the portions of said mask means defining the absolute value of the negative value of said aperture response.

3. The apparatus as set forth in claim 3 further including:

first light transmission means for transmitting the light from said positive value defining portions of said mask means to said first light sensitive means, and second light transmission means for transmitting the light from said negative value defining portions of said mask means to said second light sensitive means.

4. The apparatus as set forth in claim 3 wherein said first and second light transmission means comprises first and second pluralities of optical fibers, respectively.

5. The apparatus as set forth in claim 1 wherein the optical transmission characteristic of said optical mask means is in accordance with the absolute value of the relationship $$(\sin \pi s/d / \pi s/d)$$

where $d$ is the separation of the scan lines and s is the aperture response independent variable.

6. The apparatus as set forth in claim 2 wherein said first and second light sensitive means comprise first and second pluralities of photosensors, respectively, in a predetermined array.

7. In an aperture scanning apparatus for use in a facsimile transmission system, an optical mask in the path of the information modulated light reflected from a document comprising substrate means upon which is recorded a pattern of light and dark areas comprising a shadow pattern with portions having transmissivities defining the absolute values of positive and negative values in accordance with a predetermined response of the aperture.

8. The mask as set forth in claim 7 wherein the optical transmission characteristic of said optical mask is the absolute value of the aperture response, the aperture response having the relationship $$(\sin \pi r/d/\pi s/d)$$

where $d$ is the separation of the scan lines and $s$ is the aperture response independent variable, the Fourier transform of said aperture response being substantially uniform within the baseband frequency of the facsimile transmission system and substantially zero outside the baseband.

9. In a facsimile transmission system, the method of improving the overall modulation transfer function thereof, comprising the step of:

passing the information modulated light derived from a document prior to photoelectric detection through an optical mask having shadow patterns comprising portions with transmissivities defining the absolute values of positive and negative values in accordance with a predetermined calculation of the aperture response.

10. The method as set forth in claim 9 wherein the optical transmission characteristic of said optical mask is the absolute value of $$(\sin \pi s/d/\pi s/d)$$

where $d$ is the separation of the scan lines, and $s$ is the aperture response independent variable.

11. In a facsimile transmission system, the method of improving the overall modulation transfer function thereof, comprising the step of:

modulating the information modulated light obtained in scanning a document to be transmitted by a predetermined aperture response prior to photoelectric detection, the absolute value of said predetermined aperture response being realized by an optical mask having shadow patterns comprising portions with transmissivities defining the absolute values of positive and negative values in accordance with a predetermined calculation of said aperture response.

12. The method as set forth in claim 11 wherein said predetermined aperture response is defined by $$(\sin \pi s/d/\pi s/d)$$

where $d$ is the separation of the scan lines, and $s$ is the aperture response independent variable.

13. In a facsimile system including a document to be scanned and an illumination source, a multi-aperture facsimile scanner comprising:

mask means adjacent a document to be scanned having a light transmission response characteristic of the absolute value of the aperture response, said aperture response being defined by $$(\sin \pi s/d/\pi s/d)$$

where $d$ is the separation of the scan lines, and $s$ is the aperture response independent variable, said mask means having shadow patterns comprising portions with transmissivities defining the absolute values of positive and negative values of said aperture response, first light sensitive means for receiving the light transmitted through the portions of said mask means defining the absolute value of the positive values of said aperture response and generating an electrical signal in response thereto, second light sensitive means for receiving the light transmitted through the portions of said mask means defining the absolute value of the negative values of said aperture response and generating an electrical signal in response thereto, and means for combining the outputs of said first and second light sensitive means into a combined electrical signal.

14. The scanner as set forth in claim 13 further including:

first light transmission means adjacent said mask means for transmitting the light response through the portions of said mask means defining the absolute value of the positive values of said aperture response to said first light sensitive means, and second light transmission means adjacent said mask means for transmitting the light response through the portions of said mask means defining the absolute value of the negative values of said aperture response to said second light sensitive means.

15. The scanner as set forth in claim 13 wherein said first and second light sensitive means comprise first and second pluralities of photosensors, respectively, in a predetermined array.

16. In a facsimile transmission system a multi-aperture scanner comprising:

mask means adjacent a document or the like to be scanned having a shadow pattern of areas with a predetermined optical transmission characteristic defining the absolute value of the aperture response which has positive and negative values, the Fourier transform of said aperture response being substantially uniform within the baseband of spatial frequencies of the facsimile transmission system and substantially zero outside the baseband, first light sensitive means for receiving the light transmitted through certain areas of said mask means and generating a first electrical signal in response thereto, and second light sensitive means for receiving the light transmitted through certain other areas of said mask means and generating a second electrical signal in response thereto.

17. The scanner as set forth in claim 16 further including:

means for combining the outputs of said first and second light sensitive means into a combined electrical signal.

18. The scanner as set forth in claim 16 further including:

first light transmission means adjacent said mask means for transmitting the light response through said certain areas of said mask means to said first light sensitive means, and second light transmission means adjacent said mask means for transmitting the light response through said certain other areas of said mask means to said second light sensitive means.

19. The scanner as set forth in claim 18 wherein said first and second light sensitive means comprise first and second pluralities of photosensors, respectively, in a predetermined array.

20. Aperture scanning apparatus in a facsimile transmission system comprising:

optical means having a shadow pattern comprising portions with transmissivities defining the absolute values of a predetermined aperture response in the path of the information modulated light reflected from a document, said transmissivities defining the absolute values of positive and negative values in accordance with a predetermined calculation of said aperture resonse, said optical means including a mask for separating the scanned area into a plurality of sub-areas, first light sensitive means responsive to certain ones of said sub-areas for generating a first electrical signal, second light responsive means responsive to the remainder of said sub-areas for generating a second electrical signal, means for inverting the first electrical signal, and means for adding the inverted signal to said second electrical signal.

21. A system as set forth in claim 20 wherein the sensing means each comprise a plurality of photosensors in a predetermined array.

22. An aperture scanning station in a facsimile transmission system comprising an optical mask having a predetermined optical transmission characteristic which defines the absolute value of the scanning aperture response, said optical transmission characteristic having the absolute values of both positive and negative values of said scanning aperture response, separate means to sense the light passing through the mask from the portions defining the absolute values of the positive and negative values of said aperture response respectively, and means to produce a signal responsive to the difference between the light sensed from the portions defining the absolute values of the positive and negative values of said aperture response.

23. A system as set forth in claim 22 comprising first light transmission means for transmitting the light from the portions of the mask defining the absolute value of the positive values to a first sensing means in said separate sensing means and second light transmission means for transmitting the light from the portions of the mask defining the absolute value of the negative value to a second sensing means in said separate sensing means.

24. A system as set forth in claim 23 wherein the first and second light transmission means each comprise a plurality of optical fibers.

25. A system as set forth in claim 24 wherein the optical transmission characteristic of the mask is the absolute value of the function $$(\sin \pi s/d/\pi s/d)$$

where $d$ is the separation of the scan lines of the scanning station and $s$ is the aperture response independent variable.

26. A system as set forth in claim 25 wherein the sensing means each produce an electrical signal, and the signal producing means is arranged to produce an output electrical signal equal to the difference between the electrical signals of the sensing means.

27. A method of facsimile transmission comprising scanning a document to produce information modulated light, passing the information modulated light through an optical mask having portions with transmissivites defining the absolute value of a predetermined aperture response in accordance with a predetermined calculation of said aperture response which response has both positive and negative values, sensing the light passing through the mask from the portions defining the positive and negative values of said aperture response respectively, and producing a signal responsive to the difference between the light sensed from the portions defining the positive and negative values of said aperture reponse.

28. A method as set forth in claim 27 wherein the optical transmission characteristic of the mask is the absolute value of the function $$(\sin \pi s/d/\pi s/d)$$

where $d$ is the separation of the scan lines and $s$ is the aperture response independent variable.

* * * * *